United States Patent
Kang et al.

(10) Patent No.: US 11,307,697 B2
(45) Date of Patent: Apr. 19, 2022

(54) DISPLAY DEVICE WITH TWO DISPLAY PANEL

(71) Applicants: HannStar Display (Nanjing) Corporation, Nanjing (CN); HannStar Display Corporation, Taipei (TW)

(72) Inventors: Mu-Kai Kang, Pingtung County (TW); Jing-Xuan Chen, Tainan (TW); Cheng-Yen Yeh, Taichung (TW); Sz-Kai Huang, Taichung (TW)

(73) Assignees: Hann Star Display (Nanjing) Corporation, Nanjing (CN); Hann Star Display Corporation, Taipei (TW)

( * ) Notice: Subject to any disclaimer, the term of this patent is extended or adjusted under 35 U.S.C. 154(b) by 0 days.

(21) Appl. No.: 17/114,453

(22) Filed: Dec. 7, 2020

(65) Prior Publication Data
US 2021/0089158 A1 Mar. 25, 2021

Related U.S. Application Data

(63) Continuation-in-part of application No. 16/836,898, filed on Mar. 31, 2020, now Pat. No. 10,915,196.
(Continued)

(30) Foreign Application Priority Data

Dec. 29, 2016 (CN) .......................... 201611244094.2
Aug. 28, 2020 (CN) .......................... 202010882285.1

(51) Int. Cl.
*G06F 3/041* (2006.01)
*G06F 3/047* (2006.01)
*G06F 3/044* (2006.01)

(52) U.S. Cl.
CPC ............ *G06F 3/0412* (2013.01); *G06F 3/047* (2013.01); *G06F 3/04164* (2019.05); *G06F 3/044* (2013.01)

(58) Field of Classification Search
None
See application file for complete search history.

(56) References Cited

U.S. PATENT DOCUMENTS 10,423,258 B2   9/2019  Huang et al.
2012/0249444 A1  10/2012  Lee et al.
(Continued)

FOREIGN PATENT DOCUMENTS

CN   104571655 A    4/2015
CN   105629597 A    6/2016
KR   20140004887 A  1/2014

OTHER PUBLICATIONS

C. Lin et al.,"Gate Driver Circuit Using Pre-Charge Structure and Time-Division Multiplexing Driving Scheme for Active-Matrix LCDs Integrated with In-Cell Touch Structures", Journal of Display Technology, Nov. 30, 2016, pp. 1238-1241, vol. 12, No. 11.
(Continued)

*Primary Examiner* — Kent W Chang
*Assistant Examiner* — Benjamin Morales
(74) *Attorney, Agent, or Firm* — CKC & Partners Co., LLC

(57) ABSTRACT

An in-cell touch display panel includes a sensing line. A touch electrode corresponds to more than one pixel electrodes. A first insulation layer is formed on the sensing line and has a first opening to expose the sensing line. A gate of a thin film transistor (TFT) is formed on the first insulation layer. A second insulation layer is formed on a gate line and has a second opening corresponding to the first opening. A source of the TFT is formed on the second insulation layer. A third insulation layer is formed on the source and has a third opening corresponding to the second opening. The touch electrode is formed on the third insulation layer and
(Continued)

electrically connected to the sensing line through the third opening, the second opening, and the first opening.

11 Claims, 9 Drawing Sheets

Related U.S. Application Data which is a continuation of application No. 15/836,933, filed on Dec. 11, 2017, now Pat. No. 10,649,566.

(56) References Cited

U.S. PATENT DOCUMENTS

| | | |
|---|---|---|
| 2014/0084992 A1 | 3/2014 | Chen et al. |
| 2015/0022501 A1 | 1/2015 | Kita |
| 2015/0091849 A1 | 4/2015 | Ludden |
| 2015/0364507 A1* | 12/2015 | Won .................. G06F 3/0412 |
| | | 257/43 |
| 2016/0062520 A1 | 3/2016 | Choi |
| 2016/0070395 A1 | 3/2016 | Hung et al. |
| 2016/0105952 A1* | 4/2016 | Park .................. G02F 1/1309 |
| | | 345/174 |
| 2016/0109993 A1 | 4/2016 | Hung et al. |
| 2016/0188061 A1 | 6/2016 | Cho et al. |
| 2017/0176798 A1* | 6/2017 | Ahn .................. G02F 1/1345 |
| 2017/0192573 A1* | 7/2017 | Kim .................. G06F 3/0446 |
| 2018/0052552 A1* | 2/2018 | Tsai .................. H01L 27/323 |
| 2018/0181277 A1* | 6/2018 | Ahn .................. G06F 3/0481 |
| 2018/0356924 A1* | 12/2018 | Hsieh .................. G06F 3/0412 |

OTHER PUBLICATIONS

Wang Yonggui et al., "Introduction of Technology of Integrated Capacitive Touch Screen", Technology Research, Nov. 19, 2015, pp. 236-241, vol. 39 (S1).

\* cited by examiner

DISPLAY DEVICE WITH TWO DISPLAY PANEL

RELATED APPLICATIONS

This application claims priority to China Application Serial Number 202010882285.1 filed Aug. 28, 2020, and also is a continuation-in-part of U.S. application Ser. No. 16/836,898, filed Mar. 31, 2020, which is a continuation of the U.S. application Ser. No. 15/836,933 filed Dec. 11, 2017 now U.S. Pat. No. 10,649,566, issued on May 12, 2020, which claims priority to China Application Serial Number 201611244094.2 filed Dec. 29, 2016, all of which are herein incorporated by reference.

BACKGROUND

Field of Invention

The present disclosure relates to an in-cell display touch panel. More particularly, the present disclosure relates to the in-cell touch display panel in which a common electrode serves as a touch electrode.

Description of Related Art

A TDDI (Touch with Display Driver Integration) single chip is connected to data lines and sensing lines which are connected to touch electrodes, thereby enabling the single chip to control both functions of touch and display. It is an issue about how to dispose the sensing lines.

SUMMARY

Embodiments of the present disclosure provide an in-cell touch display panel having a display area and a non-display area. The in-cell touch display panel includes the following units. Multiple gate lines and multiple data lines are intersected with each other on a substrate. Multiple sensing lines are disposed on the substrate. Multiple pixel regions are disposed in areas where the gate lines are intersected with the data lines, in which each of the pixel regions has a pixel structure, and each of the pixel structures includes a pixel electrode formed by a first transparent conductive layer. A touch electrode is formed by a second transparent conductive layer, in which the touch electrode corresponds to more than one of the pixel electrodes. A thin film transistor is formed in each of the pixel structure. The thin film transistor includes a gate, a source, a drain and a semiconductor layer. The source is electrically connected to one of the data lines. The gate is electrically connected to one of the gate lines. The drain is electrically connected to one of the pixel electrodes. A first insulation layer is formed on the sensing lines and having a first opening to expose one of the sensing lines, in which the gate is formed on the first insulation layer. A second insulation layer is formed on the gate lines and has a second opening corresponding to the first opening, in which the source is formed on the second insulation layer. A third insulation layer is formed on the source and has a third opening corresponding to the second opening. The touch electrode is formed on the third insulation layer. The touch electrode is electrically connected to one of the sensing lines through the third opening, the second opening and the first opening.

In some embodiments, the first insulation layer and the second insulation layer have same material. The first insulation layer has a first side in the first opening, the second insulation layer has a second side in the second opening, and the first side and the second side form a downhill surface.

In some embodiments, the panel further includes a metal connection structure having same material as the data lines, in which the metal connection structure is formed between the touch electrode and the one of the sensing lines.

In some embodiments, an etching rate of the first insulation layer is less than an etching rate of the second insulation layer.

In some embodiments, the panel further includes multiple display pads and multiple touch pads in the non-display area. Each of the data lines is electrically connected to one of the display pads. Each of the sensing lines is electrically connected to one of the touch pads. One of the display pads is disposed between two of the touch pads, and one of the touch pads is disposed between two of the display pads.

In some embodiments, a number of the touch pads is less than a number of the display pads. The display pads and the touch pads are arranged as multiple rows, and one of the rows only consists of the touch pads.

In some embodiments, the display pads and the touch pads are arranged as multiple rows. A first row only consists of a portion of the display pads, and a second row includes a portion of the display pads and a portion of the touch pads.

In some embodiments, the display pads and the touch pads are arranged as multiple rows. In one of the rows, a same number of the display pads are disposed between any two of the touch pads.

In some embodiments, the non-display area includes a signal line transferring area and a fan-out area. In the display area, the sensing lines are formed by a first metal layer. In the signal line transferring area, one of the sensing lines or the data lines is transferred to another metal layer through a connection structure.

In some embodiments, one of the sensing lines includes a first portion and a second portion. The connection structure includes the following units. The first portion is formed by the first metal layer. The first insulation layer has a fourth opening to expose the first portion. The second insulation layer has a fifth opening corresponding to the fourth opening. The second portion is formed by a third metal layer on the second insulation layer. The third insulation layer has a sixth opening and a seventh opening, in which the sixth opening corresponds to the fourth opening, and the seventh opening exposes the second portion. The second transparent conductive layer is electrically connected to the second portion through the seventh opening and electrically connected to the first portion through the fourth opening, the fifth opening, and the sixth opening.

In some embodiments, the connection structure further includes a metal connection layer formed by the third metal layer. The metal connection layer is formed between the second transparent conductive layer and the first portion.

In the aforementioned display panel, the touch electrode may be used as common electrode and the sensing line is formed in the first metal layer, a situation of under-cut is avoided.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology but are not referred to particular order or sequence.

Figure 1:
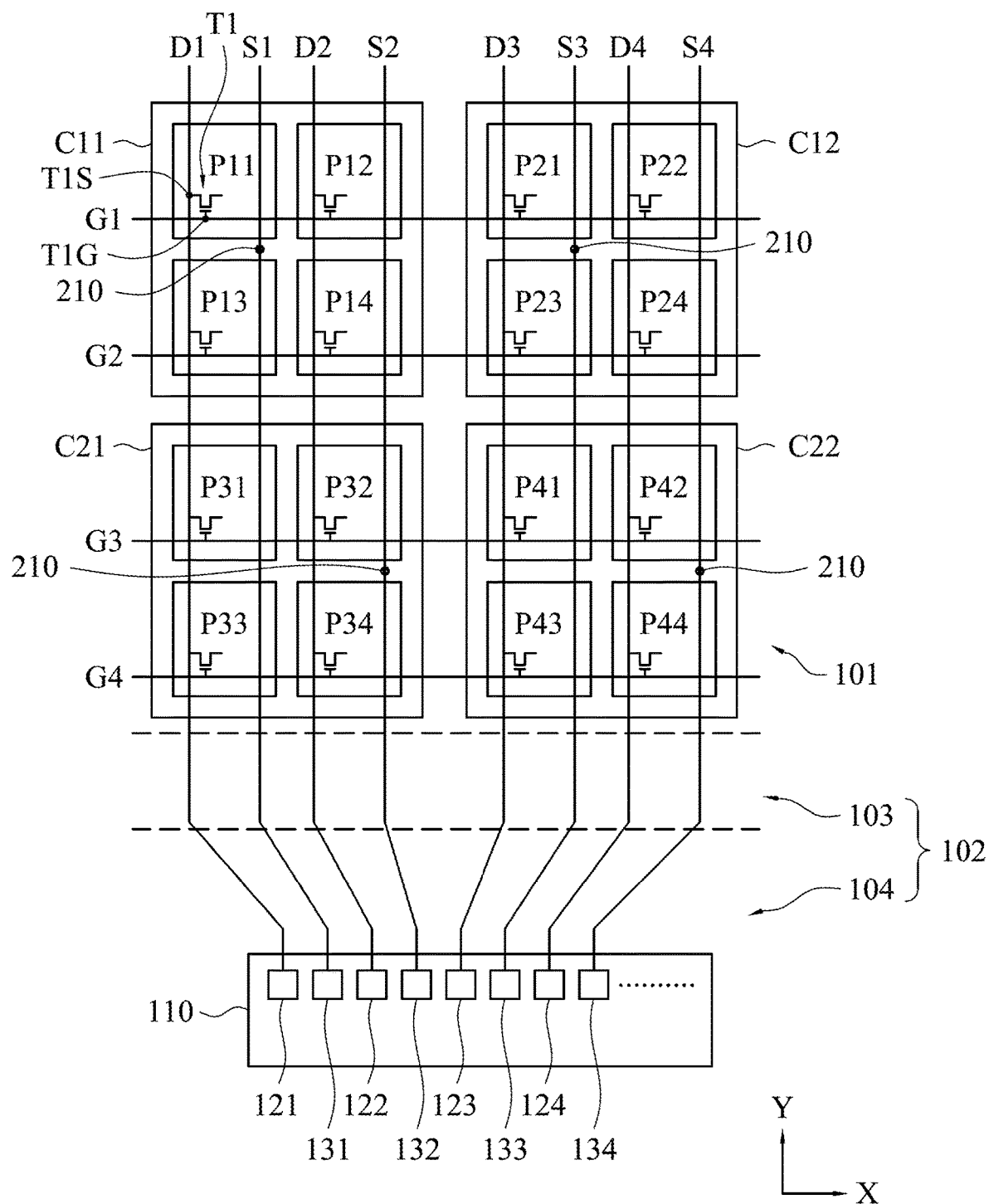
FIG. 1 is a schematic diagram illustrating connections of data lines and sensing lines in a touch display panel in accordance with an embodiment.

FIG. 1 is a schematic diagram illustrating connections of data lines and sensing lines in a touch display panel in accordance with an embodiment. Referring to FIG. 1, in an in-cell touch display panel 100, electrodes for detecting touch are disposed in pixel structures on a thin film transistor (TFT) substrate.

The in-cell touch display panel 100 has a display area 101 and a non-display area 102. The non-display area 102 includes a signal line transferring area 103 and a fan-out area 104. The display area 101 is described first. The display area 101 includes multiple pixel regions which are formed in areas where the gate lines are intersected with the data lines. Each pixel region has a pixel structure. To be specific, the display area 101 includes: pixel structures P11-P14, P21-P24, P31-P34 and P41-P44; gate lines G1-G4 extending along an X direction (also referred to a first direction); data lines D1-D4 extending along a Y direction (also referred to a second direction), in which the data lines D1-D4 are not connected to each other spatially; and sensing lines S1-S4 extending along the Y direction. The data lines D1-D4 are intersected with the gate lines G1-G4 on the substrate, and a pixel structure is disposed in each of the intersection areas. Each pixel structure includes a thin film transistor (TFT). Each of the data lines D1-D4 is electrically connected to the source of the TFT in the corresponding pixel structure, and each of the gate lines G1-G4 is electrically connected to the gate of the TFT in the corresponding pixel structure. For example, the pixel structure P11 includes a TFT T1 which has a gate T1G and a source T1S. The gate line G1 is electrically connected to the gate T1G, and the data line D1 is electrically connected to the source T1S. The display panel also includes a common electrode which is patterned to form touch electrodes C11, C12, C21 and C22 in the display area 101. Each touch electrode corresponds to multiple pixel electrodes and is electrically connected to at least one sensing line through a contact hole 210. For example, the pixel structures P11-P14 correspond to the touch electrode C11 which is electrically connected to the sensing line S1; the pixel structures P21-P24 correspond to the touch electrode C12 which is electrically connected to the sensing line S3; the pixel structures P31-P34 correspond to the touch electrode C21 which is electrically connected to the sensing line S2; and the pixel structures P44-P44 correspond to the touch electrode C22 which is electrically connected to the sensing line S4.

A period of a frame is at least divided into one or more display periods and one or more touch sensing periods. During the display period, a common voltage is applied to the touch electrodes C11, C12, C21, and C22, and the voltage on the gate lines G1-G4 are configured to turn on the TFTs in the corresponding pixel structures sequentially, and a driving circuit 110 transmits pixel data to the pixel electrodes in the corresponding pixel structures through the data lines D1-D4 in order to set grey levels of pixels. During the touch sensing period, the touch electrodes C11, C12, C21, and C22 are used for detecting touch operations performed on the in-cell touch display panel 100, and the driving circuit 110 generates a touch sensing signal according to the voltage variation on the touch electrodes C11, C12, C21, and C22. In other words, a resolution of touch operation is determined by the number of the touch electrodes that is less than a resolution of display.

The signal line transferring area 103 is located between the display area 101 and the fan-out area 104. In the signal line transferring area 103, the data lines D1-D4 and the sensing lines S1-S4 may be transferred to other metal layers. For example, the sensing lines S1-S4 are in a first metal layer in the display area 101, but are transferred to a third metal layer in the fan-out area 104. Multiple connection structures are disposed in the signal line transferring area 103 for transferring the sensing lines S1-S4 from the first metal layer to the third metal layer. The embodiment of the connection structure would be described in detail below. In addition, a transparent or opaque conductive layer may be disposed in the signal line transferring area 103 to prevent the in-cell touch display panel 100 from damage by electrostatic discharge.

Display pads 121-124 and touch pads 131-134 are disposed in the fan-out area 104 on the in-cell touch display panel 100. The driving circuit 110 is electrically connected to the display pads 121-124 and the touch pads 131-134. The display pads 121-124 are electrically connected to the data lines D1-D4 respectively and the touch pads 131-134 are electrically connected to the sensing lines S1-S4 respectively. In particular, along the X direction, one of the display pads is disposed between two of the touch pads, and one of the touch pads is disposed between two of the display pads. For example, the display pad 122 is disposed between the touch pad 131 and the touch pad 132, and the touch pad 131 is disposed between the display pad 121 and the display pad 122. In the embodiment of FIG. 1, the display pads 121-124 and the touch pads 131-134 are disposed in an interleaved way. In prior art (not shown), the display pads and the touch pads are arranged in a same row in a driving circuit, and the display pads are continuously disposed, and then the touch pads are continuously disposed next to the display pads, and thus the data lines D1-D4 would be overlapped with the sensing lines S1-S4 in the fan-out area 104. However, as shown in FIG. 1, the data lines D1-D4 are parallel with the sensing lines S1-S4 in the display area 101, and they do not overlap with each other in the non-display area 102 because the display pads 121-124 and the touch pads 131-134 are disposed in the interleaved way.

In some embodiments, the driving circuit 110 is disposed on a flexible circuit board such as a Tape Carrier Package (TCP) or a Chip on Film (COF). Alternatively, the driving circuit 110 may be disposed on the thin film transistor substrate. In addition, the driving circuit 110 may be a Touch and Display Driver Integration (TDDI) single chip providing display and touch functions simultaneously. Or, the driving circuit 110 may include multiple chips which provide display function and touch function respectively. The driving circuit 110 may be a Gate-Driver In Panel(GIP) or an Integrated Gate Driver (IGD). Moreover, the number of the driving circuit 110 may be greater than one that are disposed at two sides (e.g. upper side and lower side, or left-hand side and right-hand side) of the panel or disposed just one side of the panel.

Figure 2:
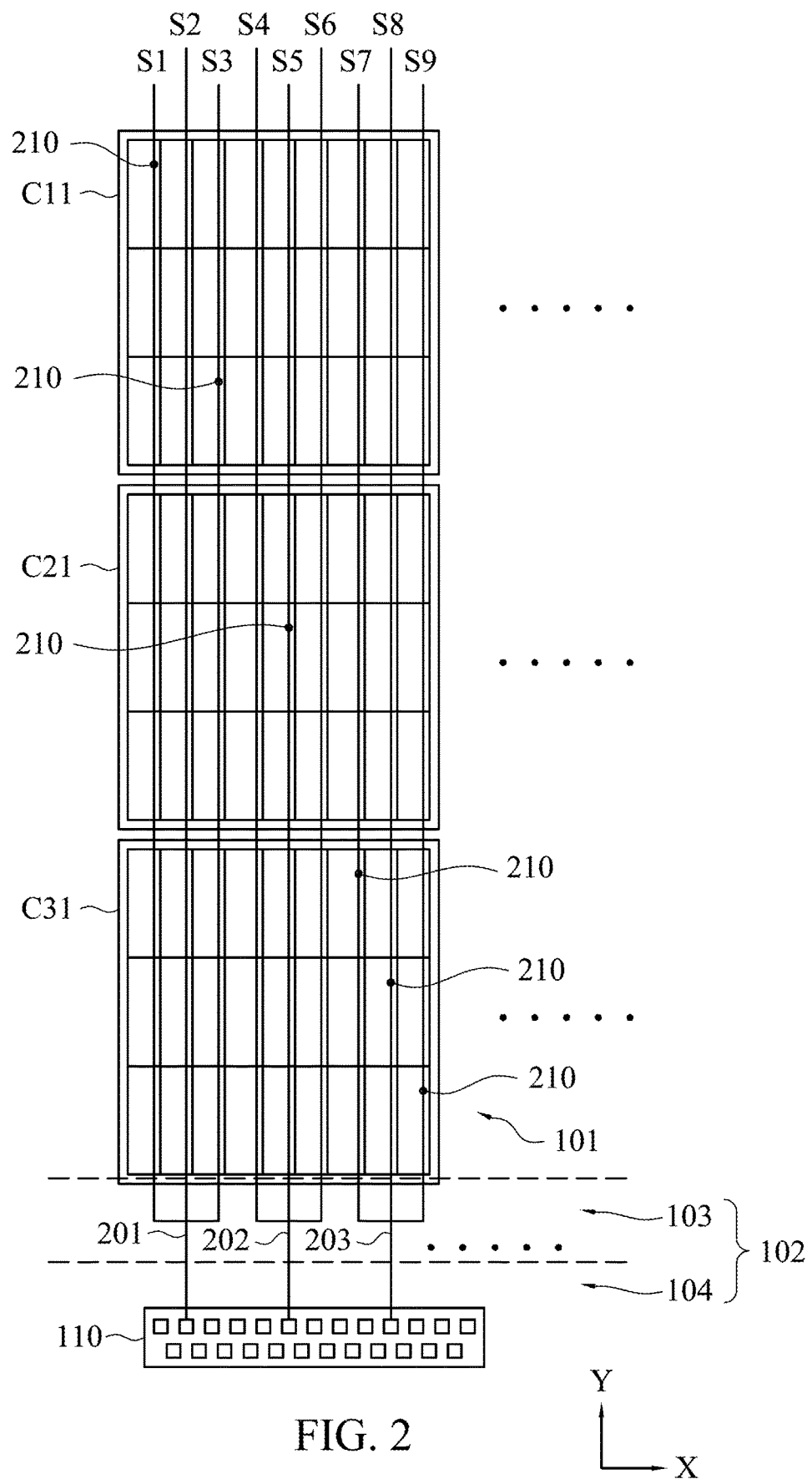
FIG. 2 is a schematic diagram illustrating connection between the sensing lines and a driving circuit in accordance with an embodiment.

Every four pixel structures share one touch electrode In FIG. 1, but more or less pixel structures may share one common electrode in other embodiments. In addition, the number of the data lines D1-D4 is equal to the number of the sensing lines S1-S4 in FIG. 1, but in practice, every pixel structure (also referred to sub-pixel) generally renders a single color, and a pixel is composed of three sub-pixels which are generally arranged along the X direction. Therefore, the resolution of the pixel structures along the X direction is greater than the resolution of the pixel structures along the Y direction. In some embodiments, at least two of the sensing lines are connected to each other and then is electrically connected to one touch pad though a conductive line. For example, referring to FIG. 2, FIG. 2 is a schematic diagram illustrating connection between the sensing lines and the driving circuit in accordance with an embodiment. For simplification, conductive lines such as the data lines and the gate lines are not shown in FIG. 2. In the embodiment of FIG. 2, each of the touch electrodes C11, C21, and C31 includes 27 pixel structures arranged as 3 rows and 9 columns. At least one of the sensing lines S1-S3 is electrically connected to the touch electrode C11 through a contact hole 210, and the sensing lines S1-S3 are connected to each other in the signal line transferring area 103, and then are electrically connected to one touch pad in the driving circuit 110 through a conductive line 201. At least one of the sensing lines S4-S6 is electrically connected to the touch electrode C21 through the contact hole 210, and the sensing lines S4-S6 are connected to each other in the signal line transferring area 103, and then they are electrically connected to one touch pad in the driving circuit 110 through a conductive line 202. At least one of the sensing lines S7-S9 is electrically connected to the touch electrode C31 through the contact hole 210, and the sensing lines S7-S9 are connected to each other in the signal line transferring area 103, and then they are electrically connected to one touch pad in the driving circuit 110 through a conductive line 203. In the embodiment of FIG. 2, two of the sensing lines S1-S3 are electrically connected to the touch electrode C11 through two contact holes 210, one of the sensing lines S4-S6 is electrically connected to the touch electrode C21 through one contact hole 210, and three of the sensing lines S7-S9 are electrically connected to the touch electrode C31 through three contact holes 210. The number of sensing lines that each touch electrode is electrically connected to is not limited in the invention. For example, if there are five sensing lines passing through one touch electrode, then the touch electrode may be electrically connected to any number (e.g. one of 1 to 5) of the five sensing lines.

In addition, each pixel structure corresponds to at least one data line, and each data line is connected to one display pad. In other words, the number of the display pads is greater than the number of touch pads. In the embodiment of FIG. 2, one touch pad is disposed between every three display pads, and thus the sensing lines and the data lines are not overlapped with each other in the non-display area 102.

FIG. 3A to FIG. 3F are schematic diagrams illustrating disposition of display pads and touch pads in accordance with some embodiments. For simplification, the data lines and the sensing lines are not shown in FIG. 3A to FIG. 3F.

Figure 3A:
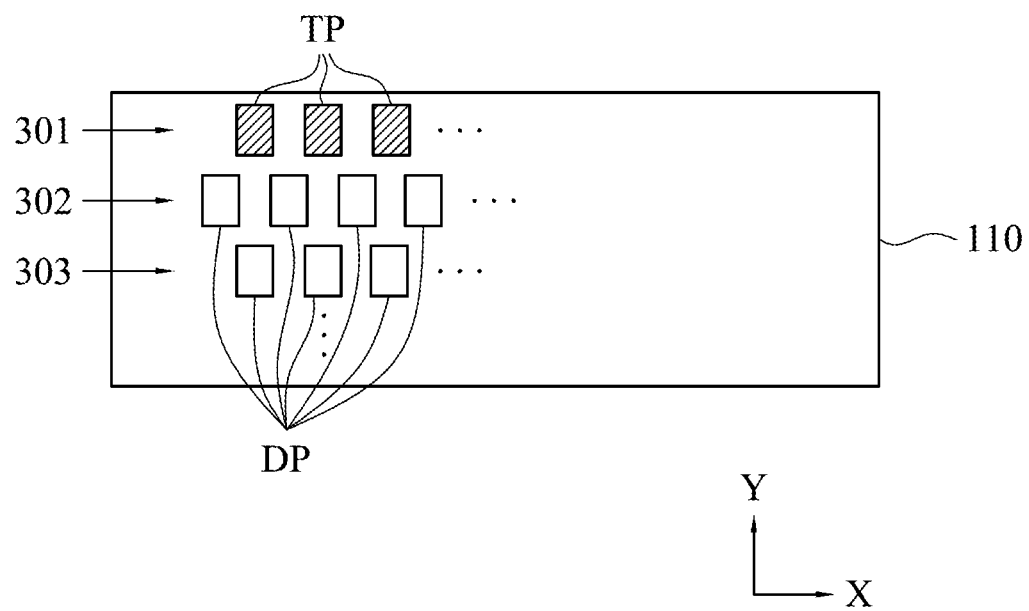
FIG. 3A to FIG. 3F is a schematic diagram illustrating disposition of display pads and touch pads in accordance with some embodiments.
Figure 3B:
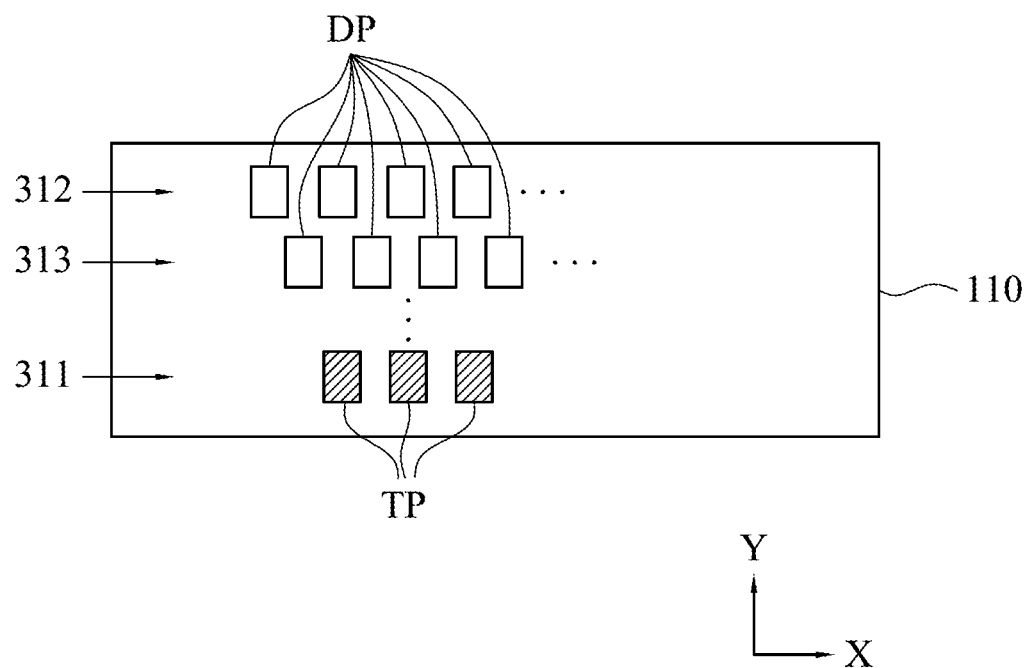

Referring to FIG. 3A, in some embodiments, the display pads and the touch pads are arranged along the Y direction, as a first row 301, a second row 302 and a third row 303. The first row 301 only includes the touch pads TP, the second row 302 and the third row 303 only include the display pads DP. In this embodiment, all touch pads are disposed in the first row 301, but all touch pads may be arranged as several rows in other embodiments. In addition, the touch pads TP are disposed on the top in FIG. 3A, that is, the touch pads TP are disposed between the display area and the display pads DP. FIG. 3B is similar to FIG. 3A, in which the display pads and the touch pads are arranged along the Y direction, as a first row 311, a second row 312 and a third row 313. The second row 312 and the third row 313 only include the display pads DP, and the first row 311 only includes the touch pads TP. However, the touch pads TP are disposed on the bottom in FIG. 3B, that is, the display pads DP are disposed between the display area and the touch pads.

Figure 3C:
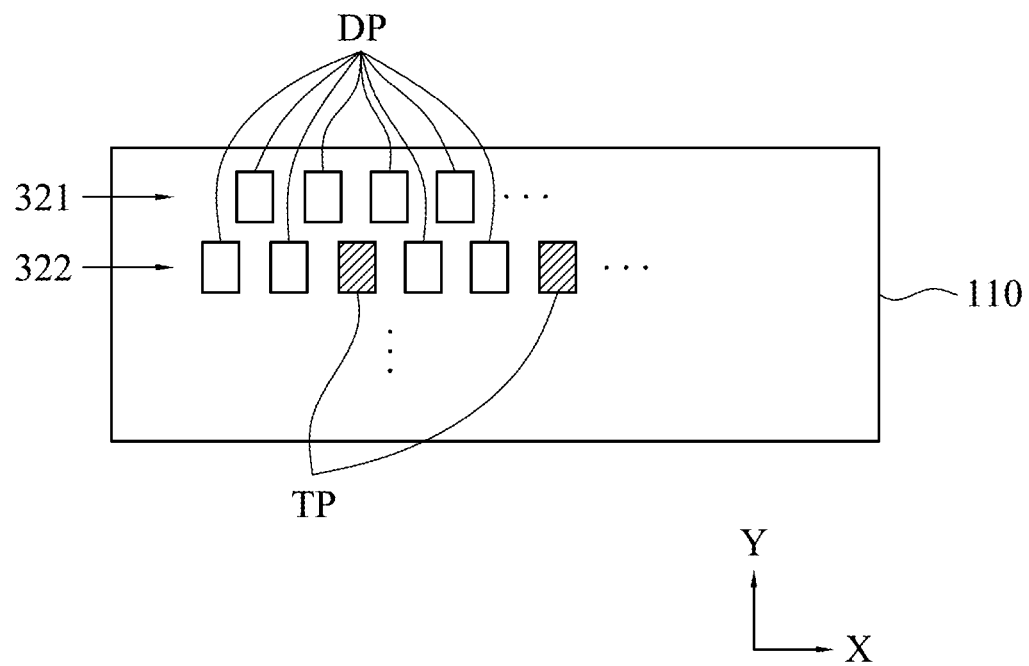
Figure 3D:
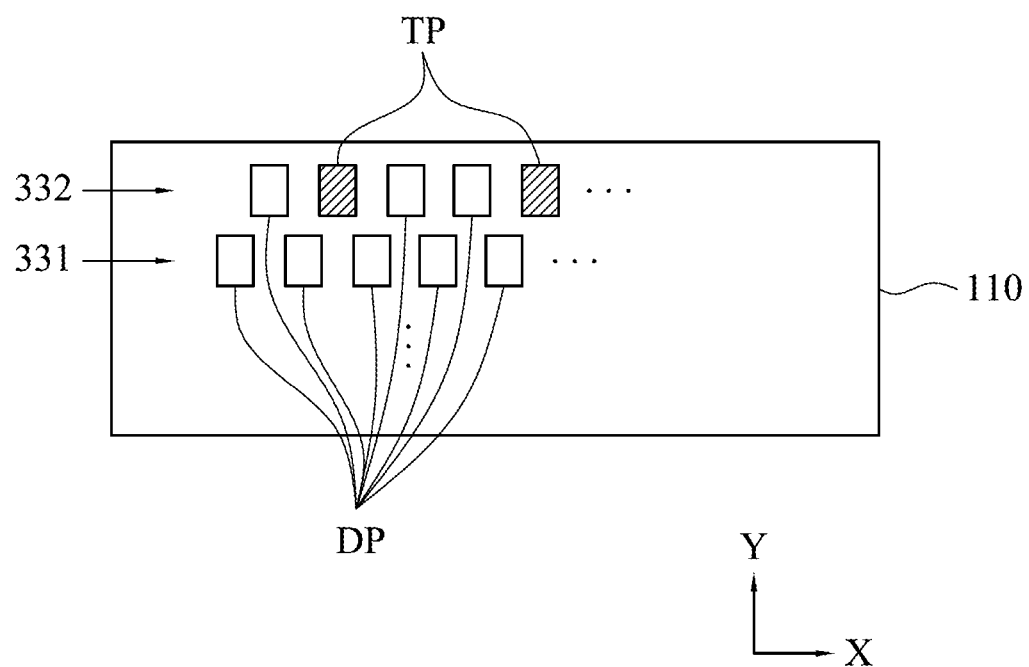

In FIG. 3C, the display pads and the touch pads are arranged along the Y direction, as a first row 321 and a second row 322. The first row 321 only includes a portion of the display pads DP, and the second row 322 includes a portion of the display pad DP and the touch pads TP. The touch pads TP are inserted into the display pads DP of the second row 322 in FIG. 3C. The first row 321 is disposed on the top, that is, the first row 321 is disposed between the display area and the second row 322. FIG. 3D is similar to FIG. 3, but the difference between FIG. 3C and FIG. 3D is that the second row 332 having the touch pads TP and the display pads DP is disposed on the top, that is, the second row 332 is disposed between the display area and the first row 331. The touch pads TP are inserted into the display pads DP of the second row 332 as shown in FIG. 3D.

Figure 3E:
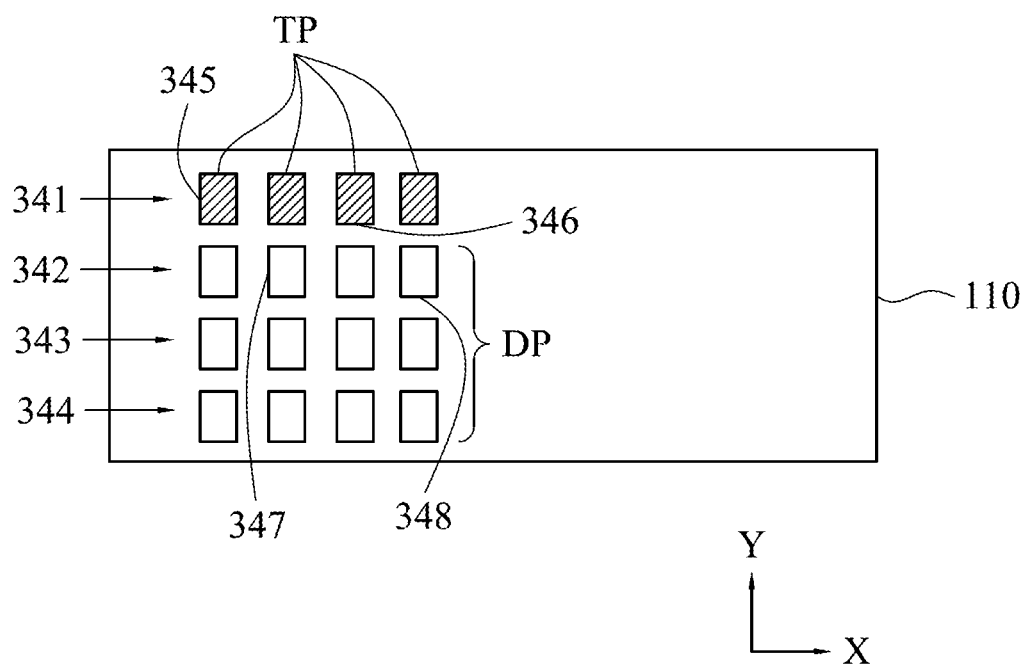

In FIG. 3E, the display pads and the touch pads are arranged along Y direction, as a first row 341, a second row 342, a third row 343 and a fourth row 344. The first row 341 only includes touch pads TP; the second row 342, the third row 343 and the fourth row 344 only include display pads DP. Moreover, the touch pads TP are overlapped with the display pads DP along Y direction.

Figure 3F:
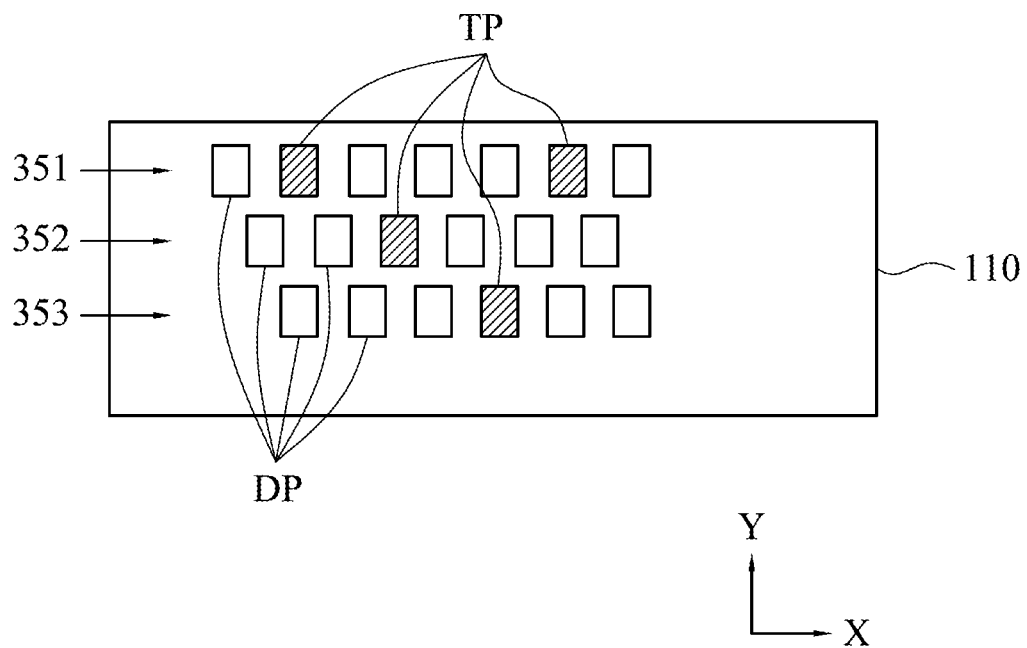

In FIG. 3F, the touch pads TP are evenly distributed in the first row 351, the second row 352 and the third row 353. In the same row, three display pads DP are disposed between two adjacent touch pads TP. In addition, the same number of display pads DP are distributed in any two touch pads TP. The touch pads TP are not overlapped with each other along Y direction.

In the embodiments of FIG. 3A to FIG. 3F, the width of each touch pad TP along the X direction is equal to that of each display pad DP. However, in other embodiments, the width of each touch pad TP along the X direction may be wider than that of the display pad DP, which is not limited in the invention. Note that the description of "one display pad is disposed between two touch pads along X direction" may be interpreted as "the projection of one display pad onto X axis is disposed between the projections of two touch pads onto X axis", and thus it encompass the embodiments of FIG. 3A to FIG. 3F. For example, in FIG. 3E, the display pads 347 is disposed between the touch pads 345 and the touch pads 346 along X direction, and the touch pads 346 is disposed between the display pads 347 and the display pads 348. From another aspect, a projection of the display pads 347 onto X axis is located between two projections of the touch pads 345 and the touch pads 346 onto X axis. A projection of the touch pads 346 onto X axis is between two projections of the display pads 347 and the display pads 348 along X axis. The description may be applied to FIG. 3A to FIG. 3D and FIG. 3F, and the description will not be repeated.

Figure 4:
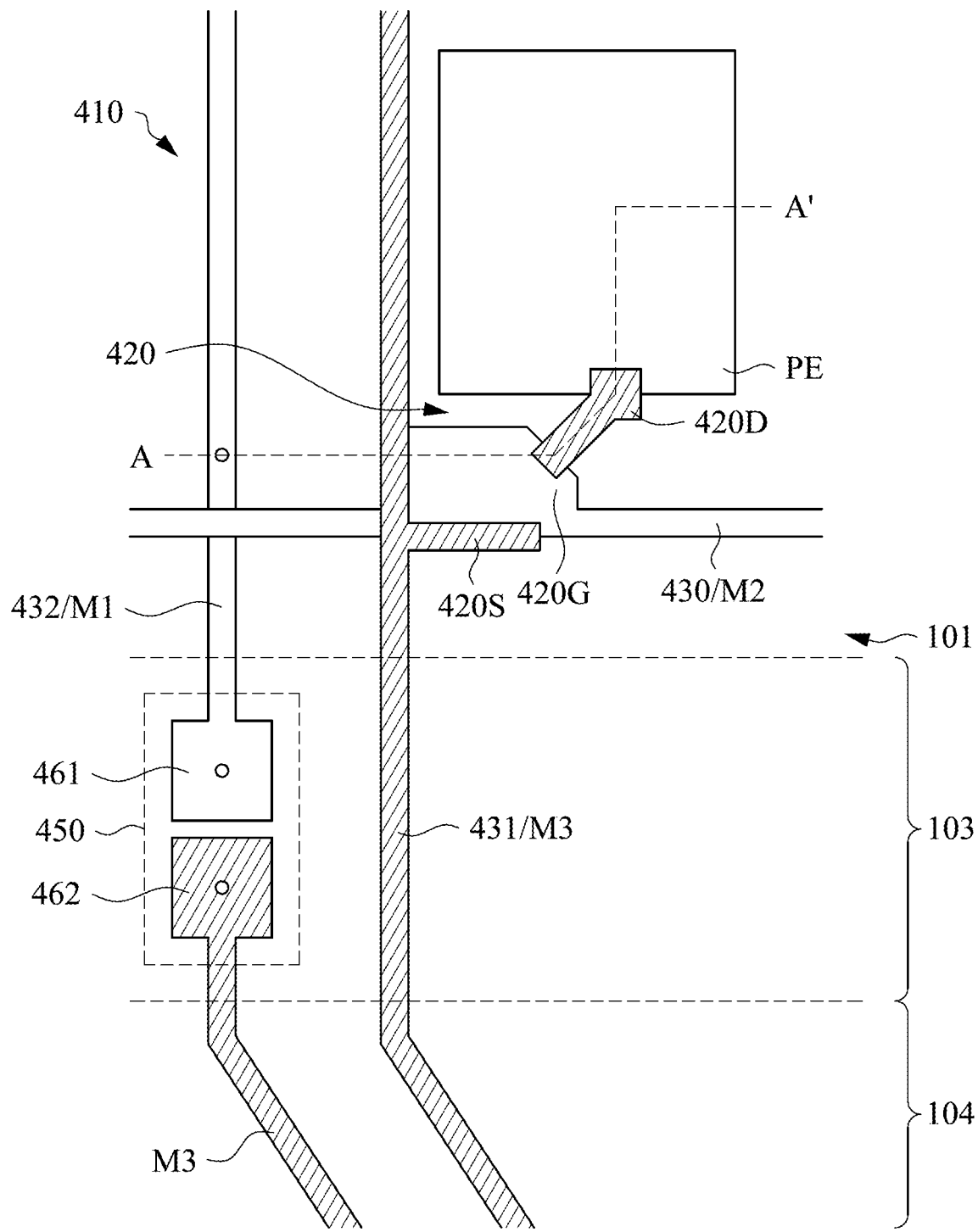
FIG. 4 is a top view of a pixel structure in accordance with an embodiment.
Figure 5:
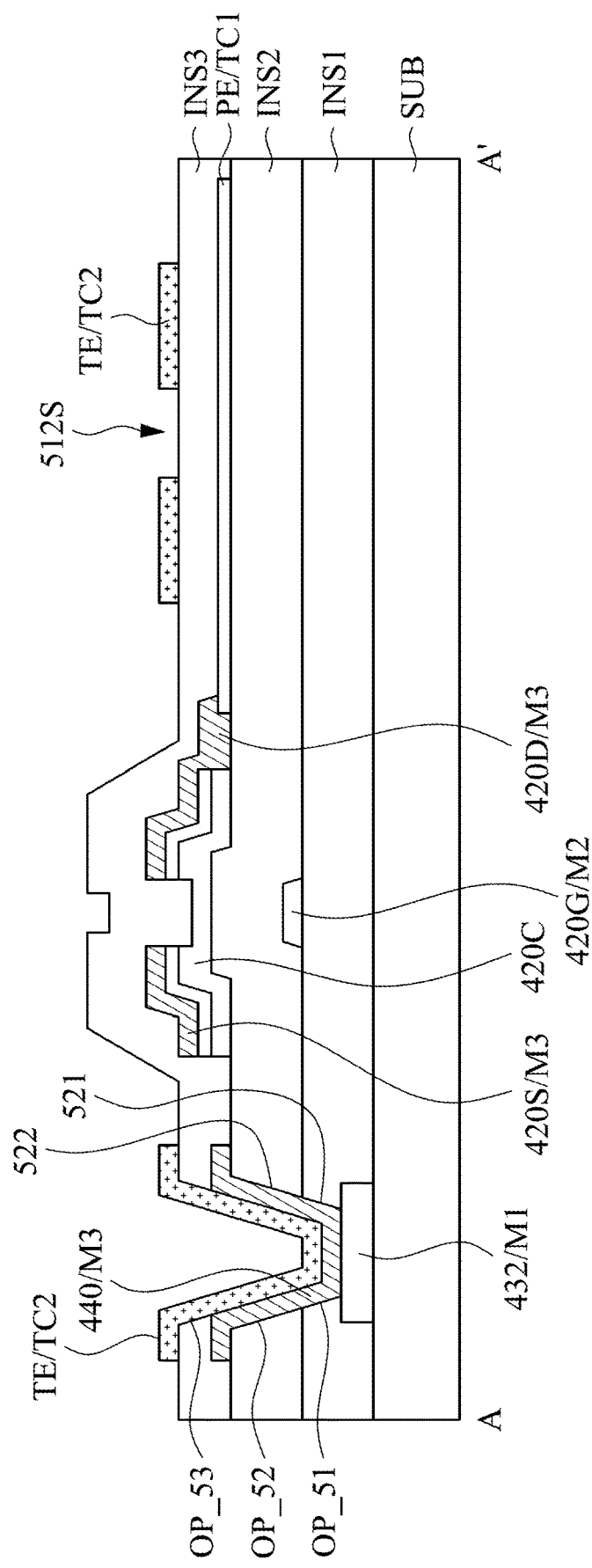
FIG. 5 is a cross-sectional view of the pixel structure of FIG. 4 along a cross-sectional line AA'.

FIG. 4 is a top view of a pixel structure in accordance with an embodiment. FIG. 5 is a cross-sectional view of the pixel structure of FIG. 4 along a cross-sectional line AA'. Referring to FIG. 4, a pixel structure 410 is taken as an example. The pixel structure 410 includes a TFT 420, a pixel electrode PE and a common electrode (not shown). The TFT 420 includes a gate 420G, a source 420S and a drain 420D. A gate line 430 formed by a second metal layer M2 is connected to the gate 420G. A data line 431 formed by a third metal layer M3 is connected to the source 420S. In addition, a sensing line 432 is formed by a first metal layer M1 and is connected to the common electrode (i.e. touch electrode) through a via. The sensing line 432 is disposed at the left-hand side of the data line 431 in the embodiment, but the sensing line 432 may be disposed at the right-hand side of the data line 431 in other embodiments.

Referring to FIG. 4 and FIG. 5. The first metal layer M1 is formed on a substrate SUB and includes the sensing line 432. A first insulation layer INS1 is formed on the first metal layer M1 and has an opening OP_51 to expose the sensing line 432. The second metal layer M2 is formed on the first insulation layer INS1 and includes the gate 420G. A second insulation layer INS2 is formed on the second metal layer M2 and includes an opening OP_52 corresponding to the opening OP_51. A first transparent conductive layer TC1 is formed on the second insulation layer INS2 and includes the pixel electrode PE. A semiconductor layer 420C is formed on the second insulation layer INS2 as a channel of the TFT. An ohmic contact layer (not shown) is formed on the semiconductor layer 420C. The third metal layer M3 is formed on the semiconductor layer 420C and includes the source 420S, the drain 420D and a metal connection structure 440. The metal connection structure 440 is electrically connected to the sensing line 432 through the opening OP_52 and the opening OP_51. The drain 420D contacts the pixel electrode PE. A third insulation layer INS3 is formed on the third metal layer M3 and has an opening OP_53 corresponding to the opening OP_52. A second transparent conductive layer TC2 is formed on the third insulation layer INS3 and includes a touch electrodes TE (i.e. common electrode). The touch electrode TE is electrically connected to the sensing line 432 through the openings OP_53, OP_52, and OP_51. In the embodiment, the touch electrode TE includes slits 512S.

In the display period, a common voltage is applied to the touch electrode TE, and the electric field between the touch electrode TE and the pixel electrode PE is used to control the orientation of liquid crystal. In the touch sensing period, the voltage of the touch electrode TE is transmitted to the driving circuit through the sensing line 432 to generate a touch sensing signal. In the embodiment of FIG. 5, the touch electrode TE is disposed above the pixel electrode PE, but the touch electrode TE may be disposed beneath the pixel electrode PE.

In some embodiments, the first insulation layer INS1 and the second insulation layer INS2 have same material and are formed by the same process (including pressure, temperature and time, etc.), and thus the etching rates thereof are the same. After etching the first insulation layer INS1 and the second insulation layer INS2 to form the opening OP_51 and the opening OP_52 respectively, the first insulation layer INS1 has a first side 521 in the opening OP_51 and the second insulation layer INS2 has a second side 522 in the opening OP_52. The first side 521 and the second side 522 form a downhill surface.

In some embodiments, the first insulation layer INS1 and the second insulation layer INS2 have the same material but different processes. The etching rate of the first insulation layer INS1 is less than that of the second insulation layer INS2 by modifying the process (e.g. temperature, pressure and/or time), and thus a situation of under-cut will not occur at a side of the first insulation layer INS1. On the other hand, the metal connection structure 440 is formed between the touch electrode TE and the sensing line 432 to prevent the touch electrode TE from breaking due to too deep hole.

Figure 6:
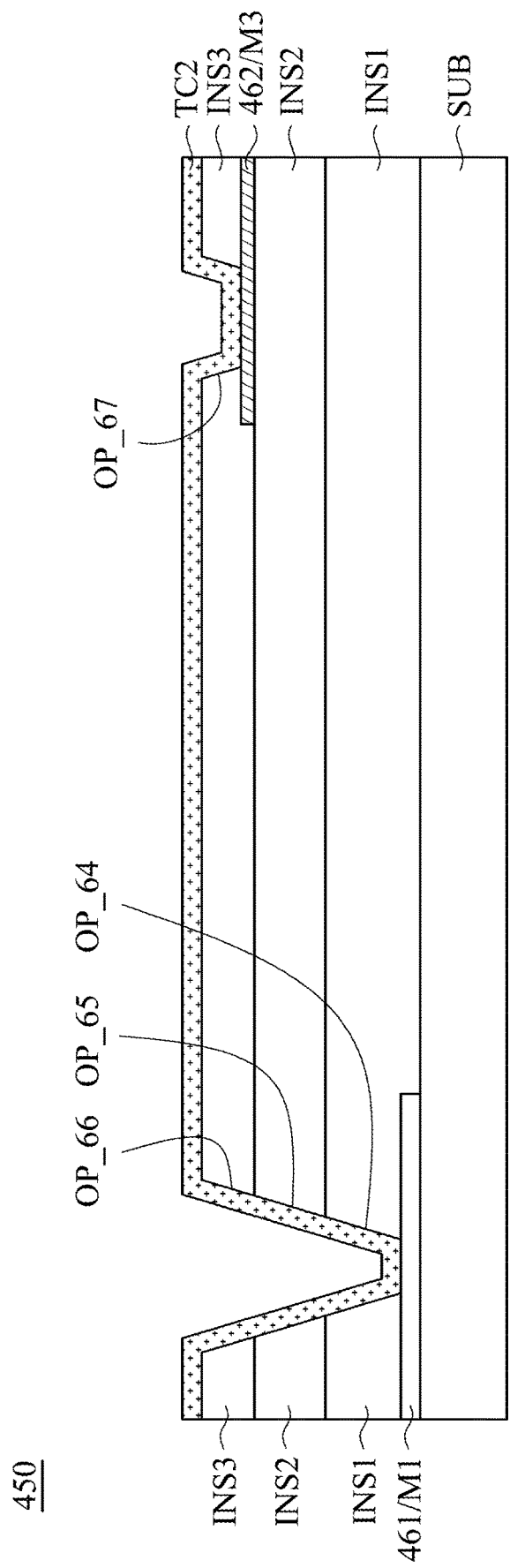
FIG. 6 is a cross-sectional view of a connection structure in accordance with an embodiment.

Referring to FIG. 4, a connection structure 450 is disposed in the signal line transferring area 103 for transferring the sensing line 432 into another metal layer. In the embodiment, the sensing line 432 includes a first portion 461 and a second portion 462. The first portion 461 is formed by the first metal layer M1, and the second portion 462 is formed by the third metal layer M3. In other words, the connection structure 450 is used to transfer the sensing line 432 from the first metal layer M1 into the third metal layer M3. In other embodiments, the connection structure 450 may transfer the sensing line 432 into the second metal layer M2. In some embodiments, the connection structure 450 does not exist for maintaining the sensing line 432 in the first metal layer M1. In some embodiments, the connection structure may be disposed on the data line 431 to transfer the data line 431 into the first metal layer M1 or the second metal layer M2. In some embodiments, among two adjacent data lines 431, the connection structure is disposed on one of the data lines to transfer it into the second metal layer M2 but not on the other data line, and thus these two data lines do not overlap in the fan-out area 104. FIG. 6 is a cross-sectional view of the connection structure 450 in accordance with an embodiment. Referring to FIG. 6, the first portion 461 is formed on the substrate SUB. The first insulation layer INS1 has an opening OP_64 to expose the first portion 461. The second insulation layer INS2 has an opening OP_65 corresponding to the opening OP_64. The second portion 462 is formed on the second insulation layer INS2. The third insulation layer INS3 has an opening OP_66 and an opening OP_67. The opening OP_66 corresponds to the opening OP_65 and the opening OP_64. The opening OP_67 exposes the second portion 462. The second transparent conductive layer TC2 is electrically connected to the second portion 462 through the opening OP_67, and is electrically connected to the first portion 461 through the opening OP_66, the opening OP_65, and the opening OP_64. The connection structure of FIG. 6 may be disposed on the data line to transfer the data line from the third metal layer into the first metal layer.

Figure 7:
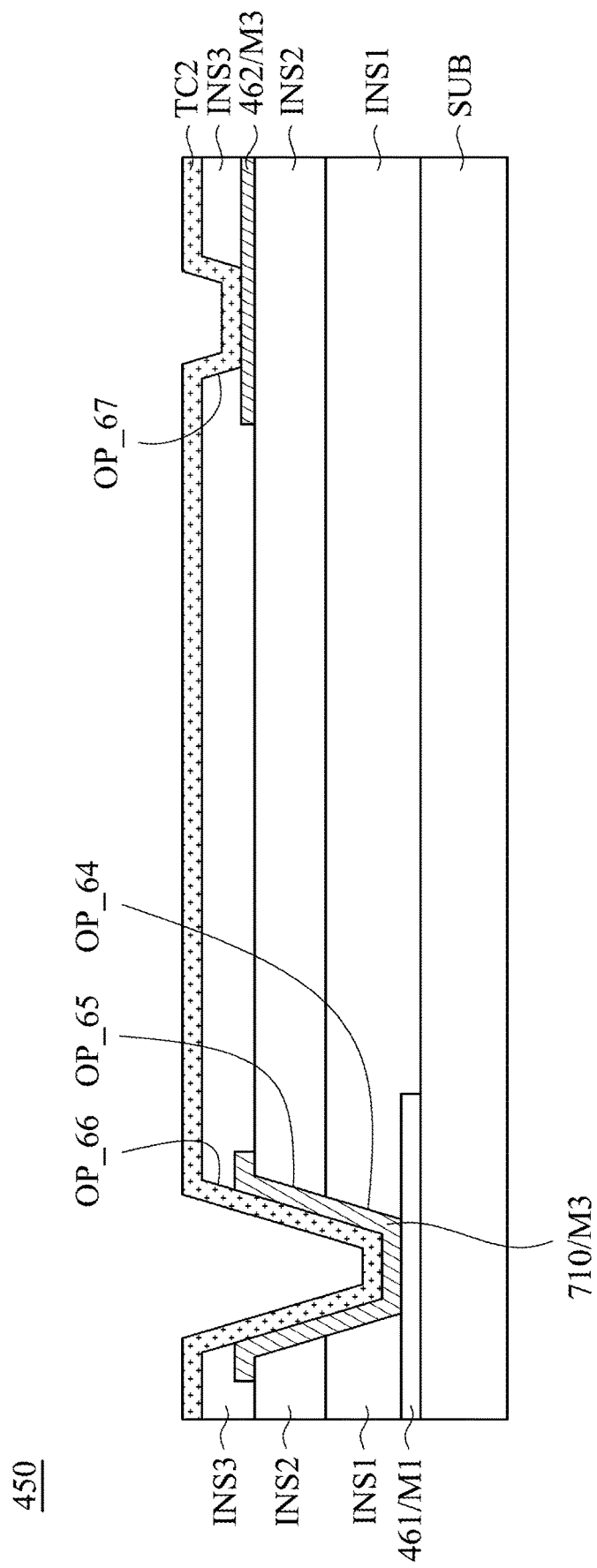
FIG. 7 is a cross-sectional view of a connection structure in accordance with an embodiment.

FIG. 7 is a cross-sectional view of the connection structure 450 in accordance with an embodiment. The difference between FIG. 7 and FIG. 6 is an additional metal connection layer 710 formed by the third metal layer M3. The metal connection layer 710 is formed between the second transparent conductive layer TC2 and the first portion 461 and is in direct contact with them. The metal connection layer 710 is used to prevent the second transparent conductive layer TC2 from breaking due to a too deep hole formed by the opening OP_66, the opening OP_65, and the opening OP_64.

The material of the aforementioned substrate may include glass, polymer, polyethylene terephthalate (PET), polycarbonate (PC), polyether sulfone (PES), triacetyl cellulose (TAC), PMMA, polyethylene, COP, polyimide (PI), and a compound material constituted by PC and PMMA, which is not limited in the invention. The material of the transparent conductive layer TC1 and TC2 may include indium tin oxide (ITO), indium zinc oxide (IZO), antimony tin oxide (ATO), fluorine tin oxide (FTO) or other conductive and transparent material such as a Nano-metal wire (e.g. nano-silver wire, nano-copper wire). The metal layer in the specification may be a single layer of aluminum, copper, titanium, tungsten, etc. or a compound layer of molybdenum-aluminum-molybdenum, titanium-aluminum-titanium, titanium-copper-titanium, etc. which is not limited in the invention. On the other hand, the insulation layer in the specification may be silicon nitride, silicon oxide, silicon oxynitride or other suitable insulation layers. Furthermore, one insulation layer shown in the figures may include two or more than two insulation layers stacked with each other with different material.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An in-cell touch display panel having a display area and a non-display area, the in-cell touch display panel comprising:
   a plurality of gate lines and a plurality of data lines that are intersected with each other on a substrate;
   a plurality of sensing lines disposed on the substrate;
   a plurality of pixel regions disposed in areas where the gate lines are intersected with the data lines, wherein each of the pixel regions has a pixel structure, and each of the pixel structures comprises a pixel electrode formed by a first transparent conductive layer;
   a touch electrode formed by a second transparent conductive layer, wherein the touch electrode corresponds to more than one of the pixel electrodes;
   a thin film transistor formed in each of the pixel structures, wherein the thin film transistor comprises a gate, a source, a drain and a semiconductor layer, the source is electrically connected to one of the data lines, the gate is electrically connected to one of the gate lines, and the drain is electrically connected to one of the pixel electrodes;
   a first insulation layer formed on the sensing lines and having a first opening to expose one of the sensing lines, wherein the gate is formed on the first insulation layer;
   a second insulation layer formed on the gate lines and having a second opening corresponding to the first opening, wherein the source is formed on the second insulation layer; and
   a third insulation layer formed on the source and having a third opening corresponding to the second opening, wherein the touch electrode is formed on the third insulation layer, and the touch electrode is electrically connected to one of the sensing lines through the third opening, the second opening and the first opening.

2. The in-cell touch display panel of claim 1, wherein the first insulation layer and the second insulation layer have same material, the first insulation layer has a first side in the first opening, the second insulation layer has a second side in the second opening, and the first side and the second side form a downhill surface.

3. The in-cell touch display panel of claim 2, further comprising a metal connection structure having same material as the data lines, wherein the metal connection structure is formed between the touch electrode and the one of the sensing lines.

4. The in-cell touch display panel of claim 2, wherein an etching rate of the first insulation layer is less than an etching rate of the second insulation layer.

5. The in-cell touch display panel of claim 1, further comprising a plurality of display pads and a plurality of touch pads in the non-display area,
   wherein each of the data lines is electrically connected to one of the display pads,
   wherein each of the sensing lines is electrically connected to one of the touch pads,
   wherein one of the display pads is disposed between two of the touch pads, and one of the touch pads is disposed between two of the display pads.

6. The in-cell touch display panel of claim 5, wherein a number of the touch pads is less than a number of the display pads, the display pads and the touch pads are arranged as a plurality of rows, and one of the rows only consists of the touch pads.

7. The in-cell touch display panel of claim 5, wherein a number of the touch pads is less than a number of the display pads, the display pads and the touch pads are arranged as a plurality of rows, a first row of the rows consists of a portion of the display pads, and a second row of the rows comprises a portion of the display pads and a portion of the touch pads.

8. The in-cell touch display panel of claim 5, wherein a number of the touch pads is less than a number of the display pads, and the display pads and the touch pads are arranged as a plurality of rows,
   wherein in one of the rows, a same number of the display pads are disposed between any two of the touch pads.

9. The in-cell touch display panel of claim 1, wherein the non-display area comprises a signal line transferring area and a fan-out area,
   wherein in the display area, the sensing lines are formed by a first metal layer,
   wherein in the signal line transferring area, one of the sensing lines or one of the data lines is transferred to another metal layer through a connection structure.

10. The in-cell touch display panel of claim 9, wherein one of the sensing lines comprises a first portion and a second portion, and the connection structure comprises:
    the first portion formed by the first metal layer;
    the first insulation layer having a fourth opening to expose the first portion;
    the second insulation layer having a fifth opening corresponding to the fourth opening;
    the second portion formed by a third metal layer on the second insulation layer;
    the third insulation layer having a sixth opening and a seventh opening, wherein the sixth opening corresponds to the fourth opening, and the seventh opening exposes the second portion; and
    the second transparent conductive layer electrically connected to the second portion through the seventh opening and electrically connected to the first portion through the fourth opening, the fifth opening, and the sixth opening.

11. The in-cell touch display panel of claim 10, wherein the connection structure further comprises a metal connection layer formed by the third metal layer, wherein the metal connection layer is formed between the second transparent conductive layer and the first portion.

* * * * *